(12) United States Patent
Shiota

(10) Patent No.: US 9,656,904 B2
(45) Date of Patent: May 23, 2017

(54) OPTICAL GLASS, OPTICAL ELEMENT BLANK, GLASS MATERIAL FOR PRESS FORMING, OPTICAL ELEMENT, AND PROCESS FOR PRODUCING THESE

(71) Applicant: HOYA CORPORATION, Tokyo (JP)

(72) Inventor: Yuki Shiota, Akishima (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/895,290

(22) PCT Filed: Jun. 3, 2014

(86) PCT No.: PCT/JP2014/064719
§ 371 (c)(1),
(2) Date: Dec. 2, 2015

(87) PCT Pub. No.: WO2014/196523
PCT Pub. Date: Dec. 11, 2014

(65) Prior Publication Data
US 2016/0122230 A1 May 5, 2016

(30) Foreign Application Priority Data
Jun. 4, 2013 (JP) ................. 2013-118047

(51) Int. Cl.
*C03C 3/247* (2006.01)
*C03B 23/03* (2006.01)
*C03C 3/23* (2006.01)

(52) U.S. Cl.
CPC .............. *C03C 3/247* (2013.01); *C03B 23/03* (2013.01); *C03C 3/23* (2013.01)

(58) Field of Classification Search
CPC ............ C03C 3/247; C03C 3/23; C03B 23/03
See application file for complete search history.

(56) References Cited

U.S. PATENT DOCUMENTS

| 5,017,520 A | 5/1991 | Otsuka et al. |
| 7,989,377 B2 | 8/2011 | Hachitani |
| 8,198,202 B2 | 6/2012 | Ikenishi |
| 8,431,499 B2 | 4/2013 | Ikenishi |
| 2007/0060464 A1 | 3/2007 | Ikenishi et al. |
| 2008/0132400 A1 | 6/2008 | Hachitani |
| 2009/0298668 A1 | 12/2009 | Ikenishi |
| 2012/0111062 A1 | 5/2012 | Ikenishi et al. |
| 2012/0245015 A1 | 9/2012 | Ikenishi |

FOREIGN PATENT DOCUMENTS

| JP | H02-149445 A | 6/1990 |
| JP | H05-208842 A | 8/1993 |
| JP | 2002-055201 A | 2/2002 |
| JP | 2003-160356 A | 6/2003 |
| JP | 2007-076958 A | 3/2007 |
| JP | 2008-137877 A | 6/2008 |
| JP | 2009-286670 A | 12/2009 |
| JP | 2010-235429 A | 10/2010 |
| JP | 2011-037637 A | 2/2011 |
| JP | 2012-012282 A | 1/2012 |
| JP | 2012-126603 A | 7/2012 |
| JP | 2013-256439 A | 12/2013 |

OTHER PUBLICATIONS

Jun. 21, 2016 Office Action issued in Japanese Patent Application No. 2015-521453.
Sep. 9, 2014 Search Report issued in International Patent Application No. PCT/JP2014/064719.
Dec. 17, 2015 International Preliminary Report on Patentability issued in International Patent Application No. PCT/JP2014/064719.

*Primary Examiner* — Elizabeth A Bolden
(74) *Attorney, Agent, or Firm* — Oliff PLC

(57) ABSTRACT

An aspect of the present invention relates to an optical glass which contains $P^{5+}$, $Al^{3+}$, $Ba^{2+}$, and $R^{2+}$ ($R^{2+}$ is one or more selected from the group including of $Mg^{2+}$, $Ca^{2+}$, $Sr^{2+}$, and $Zn^{2+}$) as essential cationic components and $O^{2-}$ and $F^-$ as essential anionic components, the total content of $P^{5+}$, $Al^{3+}$, $Ba^{2+}$, $R^{2+}$, and $R^{l+}$ ($R^{l+}$ is one or more selected from the group including of $Li^+$, $Na^+$, and $K^+$) in the cationic component being 86% or higher, the $Al^{3+}/P^{5+}$ molar ratio being 0.70 or higher, the $Al^{3+}/(Ba^{2+}+R^{2+})$ molar ratio being 0.40 or higher, and the $Ba^{2+}/(Ba^{2+}+R^{2+})$ molar ratio being in the range of 0.50 to 0.85, and which has an Abbe's number vd of 72 or larger but less than 80, the refractive index nd and the Abbe's number vd satisfying: nd≥2.179−0.0085×vd.

16 Claims, No Drawings

OPTICAL GLASS, OPTICAL ELEMENT BLANK, GLASS MATERIAL FOR PRESS FORMING, OPTICAL ELEMENT, AND PROCESS FOR PRODUCING THESE

CROSS-REFERENCE TO RELATED APPLICATIONS

This patent application claims the benefit of Japanese Patent Appl. No. 2013-118047 filed on Jun. 4, 2013, the entire contents of which are incorporated herein.

TECHNICAL FIELD

The present invention relates to an optical glass, an optical element blank, a glass material for press forming, an optical element, and a process for producing them. More particularly, the invention relates to a fluorophosphate-based optical glass having excellent devitrification resistance as well as a high refractive index and low-dispersion properties, an optical glass blank, a glass material for press forming, and an optical element which are made of the optical glass, and a process for producing them.

BACKGROUND ART

For an optical glass having a high refractive index and low-dispersion properties, a so-called fluorophosphate-based glass containing phosphorus and fluorine has been known (e.g. refer to Patent Documents 1 to 7, English family members of Patent Document 5, US 2008/132400A1 and U.S. Pat. No. 7,989,377, English family members of Patent Document 6, US2009/298668A1, U.S. Pat. No. 8,198,202, US 2012/245015A1 and U.S. Pat. No. 8,431,499, the entire contents of which are incorporated herein).

(Patent Document 1) Japanese Patent Laid-Open Publication No. 2010-235429

(Patent Document 2) Japanese Patent Laid-Open Publication No. 2011-37637

(Patent Document 3) Japanese Patent Laid-Open Publication No. 2012-12282

(Patent Document 4) Japanese Patent Laid-Open Publication No. 2012-126603

(Patent Document 5) Japanese Patent Laid-Open Publication No. 2008-137877

(Patent Document 6) Japanese Patent Laid-Open Publication No. 2009-286670

(Patent Document 7) Japanese Patent Laid-Open Publication No. 2003-160356

SUMMARY OF THE INVENTION

There is a high demand for an optical glass having both a high refractive index and low-dispersion properties (high Abbe's number) as an optical element material of various lenses. The reason is because it is possible to constitute a compact and high functional optical system for chromatic aberration correction, for example, by blending it with a lens having a high refractive index and high dispersibility. Moreover, it is possible to further achieve high functionality and compactness of various optical systems by making the optical functional face of a lens having a high refractive index and low-dispersion properties into an aspherical face.

As a method of producing an optical element such as a lens, there has been known a method of producing the optical element by making an intermediate product referred to as an optical element blank that is similar to the shape of the optical element and then grinding and polishing the intermediate product. An aspect of the method of producing the intermediate product includes a method (also referred to as a direct press method) of making the intermediate product by press-forming a proper amount of molten glass. Another aspect includes a method where molten glass is poured into a mold to form a glass plate, this glass plate is cut into a plurality of glass pieces, the glass pieces are reheated, softened and press-formed to produce an intermediate product, and a method where a proper amount of molten glass is formed into a glass mass referred to as a glass gob, the glass mass is subjected to barrel polishing and then is reheated, softened and press-formed to obtain an intermediate product. The method of reheating, softening and press-forming the glass is referred to as a reheat press method to be distinguished from the direct press method.

As another method of producing the optical element, there has been known a method (also referred to as a precision press-forming method) where a glass material for press forming is made of molten glass, the glass material for press forming is subjected to precision press-forming by a forming mold to obtain the optical element. The precision press-forming method makes it possible to form an optical functional face of the optical element without being subjected to machining such as polishing or grinding, by transferring the shape of a forming surface of a forming mold into glass.

Even in any of the above-described direct press method, reheat press method and precision press-forming method, if crystals in the glass are precipitated during the production, it is difficult to obtain an optical element having excellent transparency. Therefore, an optical glass with suppressed crystal precipitation, namely, with high devitrification resistance, is required.

However, an optical glass having a composition that contains phosphorous and fluorine in the glass, along with high-refractive-index imparting components and low-dispersibility imparting components, generally has a strong tendency towards devitrification. Therefore, it is conventionally difficult to improve the devitrification resistance in the fluorophosphate-based optical glass having a high refractive index and low-dispersion properties.

An aspect of the present invention provides a fluorophosphate-based optical glass that is excellent in devitrification resistance while having a high refractive index and low-dispersion properties.

Another aspect of the present invention provides an optical element blank, a glass material for press forming, and an optical element, which are made of the above-described optical glass, and a process for producing them.

An aspect of the present invention relates to an optical glass, wherein it contains $P^{5+}$, $Al^{3+}$, $Ba^{2+}$, and $R^{2+}$ ($R^{2+}$ is one or more selected from the group consisting of $Mg^{2+}$, $Ca^{2+}$, $Sr^{2+}$, and $Zn^{2+}$) as essential cationic components, and contains $O^{2-}$ and $F^-$ as essential anionic components, a total content of $P^{5+}$, $Al^{3+}$, $Ba^{2+}$, $R^{2+}$, and $R'^+$ ($R'^+$ is one or more selected from the group consisting of $Li^+$, $Na^+$, and $K^+$) in a cationic component proportion being 86% or more, a molar ratio $Al^{3+}/P^{5+}$ of an $Al^{3+}$ content to a $P^{5+}$ content being 0.70 or more, a molar ratio $Al^{3+}/(Ba^{2+}+R^{2+})$ of the $Al^{3+}$ content to a total content of $Ba^{2+}$ and $R^{2+}$ being 0.40 or more, and a molar ratio $Ba^{2+}/(Ba^{2+}+R^{2+})$ of a $Ba^{2+}$ content to a total content of $Ba^{2+}$ and $R^{2+}$ being in a range of 0.50 to 0.85, and the optical glass has an Abbe's number νd of 72 or more but less than 80, a refractive index nd and the Abbe's number νd satisfying the following formula (A):

$$nd \geq 2.179 - 0.0085 \times \nu d \qquad (A).$$

The optical glass according to the above-described aspect contains $P^{5+}$, $Al^{3+}$, $Ba^{2+}$ and $R^2$ as the essential cationic component, and contains $O^{2-}$ and $F^-$ as the essential anionic component. Further, the total content and the molar ratio of the above-described respective components and $R'^+$ are configured to satisfy the above relationship, so that it is possible to obtain the fluorophosphate-based optical glass that has an Abbe's number vd in the range of 72 or more but less than 80 and a refractive index nd satisfying formula (A) in a relationship with the Abbe's number vd within this range and thereby is excellent in devitrification resistance while having a high refractive index and low-dispersion properties.

According to an aspect of the present invention, it is possible to provide a fluorophosphate-based optical glass having a high refractive index and low-dispersion properties, which is suitable for any of the direct press method, the reheat press method and the precision press-forming method. According to another aspect, an optical element blank, a glass material for press forming, and an optical element, which are made of the above-described optical glass, are also provided.

DETAILED DESCRIPTION OF EXEMPLARY EMBODIMENTS

Optical Glass

An optical glass according to an aspect of the present invention is an optical glass, wherein it contains $P^{5+}$, $Al^{3+}$, $Ba^{2+}$, and $R^{2+}$ ($R^{2+}$ is one or more selected from the group consisting of $Mg^{2+}$, $Ca^{2+}$, $Sr^{2+}$, and $Zn^{2+}$) as essential cationic components, and contains $O^{2-}$ and $F^-$ as essential anionic components, a total content of $P^{5+}$, $Al^{3+}$, $Ba^{2+}$, $R^{2+}$, and $R'^+$ ($R'^+$ is one or more selected from the group consisting of $Li^+$, $Na^+$, and $K^+$) in a cationic component proportion being 86% or more, a molar ratio $Al^{3+}/P^{5+}$ of an $Al^{3+}$ content to a $P^{5+}$ content being 0.70 or more, a molar ratio $Al^{3+}/(Ba^{2+}+R^{2+})$ of the $Al^{3+}$ content to a total content of $Ba^{2+}$ and $R^{2+}$ being 0.40 or more and a molar ratio $Ba^{2+}/(Ba^{2+}+R^{2+})$ of a $Ba^{2+}$ content to a total content of $Ba^{2+}$ and $R^{2+}$ being in a range of 0.50 to 0.85, and the optical glass has an Abbe's number vd of 72 or more but less than 80, a refractive index nd and the Abbe's number vd satisfying the following formula (A):

$$nd \geq 2.179 - 0.0085 \times vd \quad (A).$$

Hereinafter, the optical glass will be described in detail. Unless otherwise specified for the glass composition, the content and the total content of cationic components are expressed by cation % (cationic component proportion) in the glass composition of cation %, and the content and the total content of anionic components are expressed by anion % (anionic component proportion) in the glass composition of anion %. The cationic component proportion is expressed by a molar ratio in the glass composition of cation %, the anionic component proportion is expressed by a molar ratio in the glass composition of anion %, and the proportion of the cation and anionic components is expressed by a molar ratio in the glass composition of atom %. As is well known to those skilled in the art, since the glass is electrically neutral, it is possible to unambiguously induce the glass composition of atom % from the glass composition expressed by the cation and anionic component proportions, and to unambiguously induce the glass composition of cation and anionic component proportions from the glass composition expressed by atom %.

$O^{2-}$ is an essential anionic component and serves to maintain chemical durability. The content of $O^{2-}$ is preferably 40% or more, and more preferably 45% or more. In terms of maintaining thermal stability, the content is preferably 60% or less.

Further, both the thermal stability and the devitrification resistance mean that it is difficult for crystals in the glass to be precipitated. The difficulty of precipitating the crystals in the glass embraces a difficulty of precipitating crystals in glass in a melt state, a difficulty of precipitating crystals in solidified glass, inter alia, a difficulty of precipitating crystals when the solidified glass is reheated. Although both the thermal stability and the devitrification resistance include the both meanings, the thermal stability mainly refers to the former and the devitrification resistance mainly refers to the latter.

The above-described optical glass preferably contains $O^{2-}$ as the essential anionic component such that a molar ratio $O^{2-}/P^{5+}$ of the content of $O^{2-}$ to the content of $P^{5+}$ that will be described later as the essential cationic component is 3.30 or more. Accordingly, it is possible to obtain a glass that suppresses the volatilization of the glass melt and has high optical homogeneity. The molar ratio $O^{2-}/P^{5+}$ is more preferably 7/2 or more, that is, 3.50 or more. An upper limit of molar ratio $O^{2-}/P^{5+}$ is preferably 4.00 or less to maintain the thermal stability.

Meanwhile, $F^-$ is the anionic component that is essential to obtain the glass having the low-dispersion properties, and the content of $F^-$ is preferably 30% or more, and more preferably 40% or more. Moreover, in order to obtain glass (glass having excellent processability) that has chemical durability and is suitable for machining such as grinding or polishing, the content of is preferably 60% or less, and more preferably 55% or less.

As described above, the optical glass is a fluorophosphate glass containing $O^{2-}$ and $F^-$ as the essential anionic components. As any anionic components, $Cl^-$, $Br^-$, $I^-$, $S^{2-}$, $Se^{2-}$, $N^{3-}$, $NO_3^-$, $SO_4^{2-}$ or the like may be contained. The total content of the anionic components other than $O^{2-}$ and may be for example in the range of 0 to 10%. The total content of $O^{2-}$ and $F^-$ is preferably 90% or more, more preferably 95% or more, even more preferably 98% or more, and still further more preferably 99% or more.

Among the above anionic components, $Cl^-$ suppresses the glass from wetting an outer circumference of a pipe when molten glass flows out from the pipe, thus contributing to preventing the quality of the glass from being deteriorated by the wetting. In addition, $Cl^-$ has the effect of a defoamer. The content of $Cl^-$ is preferably in the range of 0 to 2%, and more preferably 0 to 1%.

As described above, $O^{2-}$ and $F^-$ are essential as the anionic components. Meanwhile, $P^{5+}$, $Al^{3+}$, $Ba^{2+}$ and $R^{2+}$ ($R^{2+}$ is one or more selected from the group consisting of $Mg^{2+}$, $Ca^{2+}$, $Sr^{2+}$ and $Zn^{2+}$) are essential as the cationic components, and $R'^+$ ($R'^+$ is one or more selected from the group consisting of $Li^+$, $Na^+$ and $K^+$) is an optional component. A total content of $P^{5+}$, $Al^{3+}$, $Ba^{2+}$, $R^{2+}$ and $R'^+$ is set to be 86% or more, thus obtaining an optical glass having high homogeneity while realizing desired optical properties. The total content of $P^{5+}$, $Al^{3+}$, $Ba^{2+}$, $R^{2+}$ and $R'^+$ is preferably 90% or more and more preferably 95% or more. The upper limit may be 100%.

$P^{5+}$ is a glass network forming component. The preferred range of the molar ratio $O^{2-}/P^{5+}$ of the $O^{2-}$ content to the $P^{5+}$ content has been described hereinbefore. A molar ratio $Al^{3+}/P^{5+}$ of the $Al^{3+}$ content to the $P^{5+}$ content will be described below.

To suppress the volatilization of the glass and improve the chemical durability, the $P^{5+}$ content is preferably 35% or less, more preferably 30% or less, and even more preferably 28% or less. To improve the thermal stability of the glass, the $P^{5+}$ content is preferably 15% or more, more preferably 18% or more, even more preferably 20% or more, and still further more preferably 22% or more.

$Al^{3+}$ is a glass network forming component, and is a component contributing to the improvement on chemical durability and processability and the low dispersion of the glass. To realize the low-dispersion properties (increase in Abbe's number), the $Al^{3+}$ content is preferably 18% or more, and more preferably 20% or more. To maintain good thermal stability, the $Al^{3+}$ content is preferably 35% or less and more preferably 30% or less.

Since $Ba^{2+}$ has the function of increasing the refractive index, $Ba^{2+}$ is an essential component in the optical glass according to the above-described aspect. Moreover, as described above, $Ba^{2+}$ is a component effective to increase the content of $Al^{3+}$ that contributes to the improvement on the chemical durability and the processability and to the low dispersion of the glass, in addition to increasing the thermal stability of the glass. In order to obtain such an effect, the $Ba^{2+}$ content is preferably 18% or more, and more preferably 20% or more. To improve the devitrification resistance during reheating such as the reheat press method, the $Ba^{2+}$ content is preferably 43% or less, and more preferably 40% or less.

$R^{2+}$ is one or more selected from the group consisting of $Mg^{2+}$, $Ca^{2+}$, $Sr^{2+}$ and $Zn^{2+}$. One or more of $R^{2+}$ are contained in the above-described optical glass as the essential components. To improve the devitrification resistance, the $R^{2+}$ content (if two or more kinds are contained, a total content thereof) is preferably 30% or less, more preferably 25% or less, and even more preferably 20% or less. To improve the stability of the glass, the $R^{2+}$ content is preferably 5% or more, and more preferably 10% or more.

To improve the thermal stability of the glass, a total amount ($Ba^{2+}+R^{2+}$) of the $Ba^{2+}$ content and the $R^{2+}$ content is preferably 30% or more, more preferably 32% or more, and even more preferably 35% or more. To improve the devitrification resistance, the total amount ($Ba^{2+}+R^{2+}$) of the $Ba^{2+}$ content and the $R^{2+}$ content is preferably 60% or less, more preferably 55% or less, and even more preferably 50% or less.

A molar ratio $Al^{3+}/(Ba^{2+}+R^{2+})$ of the $Al^{3+}$ content to the total content of $Ba^{2+}$ and $R^{2+}$ and a molar ratio $Ba^{2+}/(Ba^{2+}+R^{2+})$ of the $Ba^{2+}$ content to the total content of $Ba^{2+}$ and $R^{2+}$ will be described below.

$Mg^{2+}$ is a component contributing to the improvement on the processability or the thermal stability. The lower limit of the $Mg^{2+}$ content is for example 0% or more, and preferably 0.5% or more. To improve melting properties, the upper limit of the $Mg^{2+}$ content is preferably 10% or less, and more preferably 8% or less. The glass having a low glass transition temperature Tg is preferred because of good press-formability. The $Mg^{2+}$ content is preferably in the above-described range to obtain the optical glass of the low glass transition temperature Tg.

$Ca^{2+}$ is also a component contributing to the improvement on the processability or the thermal stability. The lower limit of the $Ca^{2+}$ content is for example 0% or more. To improve the devitrification resistance, the upper limit of the $Ca^{2+}$ content is preferably 15% or less, more preferably 12% or less and even more preferably 10% or less.

$Sr^{2+}$ is a component having the function of increasing the refractive index. The lower limit of the $Sr^{2+}$ content is for example 0% or more. To improve the devitrification resistance, the upper limit of the $Sr^{2+}$ content is preferably 15% or less, more preferably 12% or less, and even more preferably 10% or less.

$Zn^{2+}$ is a component having the function of lowering the glass transition temperature while maintaining the refractive index. To realize the low-dispersion properties, the $Zn^{2+}$ content is preferably 5% or less, and more preferably 3% or less. The $Zn^{2+}$ content may be 0%.

The above-described optical glass contains $R'^{+}$ as an optional component as well as the above-described essential components. $R'^{+}$ is one or more selected from the group consisting of $Li^{+}$, $Na^{+}$ and $K^{+}$.

To maintain the thermal stability of the glass, reduce a striae and obtain the glass having high homogeneity, the $R'^{+}$ content (if two or more kinds are contained, a total content thereof) is preferably 15% or less, more preferably 12% or less, and even more preferably 10% or less. The $R'^{+}$ content may be 0%. To maintain the thermal stability, reduce the viscosity of the glass, lower the glass transition temperature, and improve the melting properties, the $R^{+}$ content is preferably 1% or more, and more preferably 2% or more.

$Li^{+}$, $Na^{+}$ and $K^{+}$ are components that contribute to reducing the viscosity of the glass, lowering the glass transition temperature, and improving the melting properties. The $Li^{+}$ content is for example 0% or more, and preferably 2% or more. To improve the devitrification resistance or reduce the striae, the $Li^{+}$ content is preferably 20% or less, and more preferably 10% or less.

To realize the low-dispersion properties, the content of each of $Na^{+}$ and $K^{+}$ is preferably 10% or less, and more preferably 5% or less. Each of the $Na^{+}$ content and the $K^{+}$ content may be set to 0%.

The above-described glass may contain one or more (referred to as $RE^{3+}$) selected from the group consisting of $Y^{3+}$, $La^{3+}$, $Gd^{3+}$ and $Lu^{3+}$. To improve the chemical durability, realize the high refractive index, contribute to the reduction in volatilization of the glass and the reduction in striae, and prevent a raw material of the glass from remaining unmolten, the $RE^{3+}$ content (if two or more kinds are contained, a total content thereof) is preferably 14% or less, more preferably 13% or less, even more preferably 10% or less, still further preferably 8% or less, and still further more preferably less than 5%. The lower limit of the $RE^{3+}$ content is for example 0% or more, preferably 0.1% or more, more preferably 0.3% or more, and even more preferably 1% or more.

$Y^{3+}$ is a component that functions to increase the refractive index while maintaining the thermal stability. To prevent the raw material of the glass from remaining unmolten, the $Y^{3+}$ content is preferably 14% or less, more preferably 13% or less, even more preferably 10% or less, still further preferably 8% or less, and still further more preferably less than 5%. The lower limit of $Y^{3+}$ is for example 0% or more, preferably 0.1% or more, more preferably 0.3% or more, and even more preferably 1% or more.

$La^{3+}$ is a component having the function of increasing the refractive index. To prevent the raw material of the glass from remaining unmolten and maintain the thermal stability, the $La^{3+}$ content is preferably 14% or less, more preferably 13% or less, even more preferably 10% or less, still further preferably 8% or less, and still further more preferably less than 5%. The lower limit of the $La^{3+}$ content is for example 0% or more.

$Gd^{3+}$ is a component having the function of increasing the refractive index. To prevent the raw material of the glass from remaining unmolten and maintain the thermal stability, the $Gd^{3+}$ content is preferably 14% or less, more preferably 13% or less, even more preferably 10% or less, still further preferably 8% or less, and still further more preferably less than 5%. The lower limit of the $Gd^{3+}$ content is for example 0% or more.

$Lu^{3+}$ is a component having the function of increasing the refractive index. To prevent the raw material of the glass from remaining unmolten, the $Lu^{3+}$ content is preferably 14% or less, more preferably 13% or less, even more preferably 10% or less, still further preferably 8% or less, and still further more preferably less than 5%. The lower limit of the $Lu^{3+}$ content is for example 0% or more.

The above-described optical glass is configured such that a molar ratio $Al^{3+}/P^{5+}$ of the $Al^{3+}$ content to the $P^{5+}$ content, among the above-described cationic components, is 0.70 or more to obtain the glass having desired dispersion properties and high homogeneity. The molar ratio $Al^{3+}/P^{5+}$ of 0.70 or more may contribute to the improvement on the chemical durability. The molar ratio $Al^{3+}/P^{5+}$ is preferably 0.75 or more, and more preferably 0.80 or more.

In the above-described optical glass, a molar ratio $Al^{3+}/(Ba^{2+}+R^{2+})$ is set to 0.40 or more to achieve the desired low-dispersion properties. The molar ratio $Al^{3+}/(Ba^{2+}+R^{2+})$ is preferably 0.45 or more, and more preferably 0.50 or more. Meanwhile, in order to maintain the thermal stability and improve the devitrification resistance during reheat forming such as the reheat press method, the molar ratio $Al^{3+}/(Ba^{2+}+R^{2+})$ is preferably 0.75 or less, and more preferably 0.70 or less.

To suppress devitrification (devitrification of the glass melt) during the melting of the glass or devitrification during the reheat forming such as the reheat press method, the molar ratio $Ba^{2+}/(Ba^{2+}+R^{2+})$ is in the range of 0.50 to 0.85. The upper limit of this molar ratio is preferably 0.80 or less, and more preferably 0.75 or less. The lower limit of this molar ratio is preferably 0.52 or more, and more preferably 0.55 or more.

Examples of other addible components may include $Si^{4+}$, $B^{3+}$ and components that serve as a clarifying agent. Hereinafter, these components will be described.

The above-described optical glass may contain $Si^{4+}$ as well as the above-described cationic components. To maintain melting properties or thermal stability and reduce volatility, the $Si^{4+}$ content is preferably 5% or less, more preferably 3% or less, and even more preferably 1% or less. The $Si^{4+}$ content may be 0%.

The above-described optical glass may contain $B^{3+}$. To maintain melting properties or thermal stability and suppress the volatility of the glass, the $B^{3+}$ content is preferably 5% or less, more preferably 3% or less, and even more preferably 1% or less. The $B^{3+}$ content may be 0%.

Sb may be added as the clarifying agent. To suppress the coloring of the glass or inhibit the forming surface of the forming mold from being deteriorated due to oxidation, the added amount of Sb is preferably 0 to 1 mass %, more preferably 0 to 0.5mass %, and even more preferably 0 to 0.1 mass % based on the glass composition excluding $Sb_2O_3$.

Sn may also be added as the clarifying agent. To suppress the coloring of the glass or inhibit the forming surface of the forming mold from being deteriorated due to oxidation, the added amount of Sn is preferably 0 to 1 mass %, and more preferably 0 to 0.5mass % based on the glass composition excluding $SnO_2$.

In addition to the above-described components, small amounts of Ce oxide, sulfate, nitrate, chloride and fluoride may be added as the clarifying agent.

It is preferable that Pb, As, Cd, U and Th are not introduced in consideration of environmental impact.

Moreover, it is preferable that a substance causing the coloring, such as Cu, Er, Eu, Tb, Cr, Co, Ni or Nd, is not introduced to give excellent light transmittance to the glass.

In the context of the present invention, expression "not introduced", "not contained", or "0%" in the content of a constituent means that no constituent is introduced as the glass component. However, unintended inclusion as impurities is acceptable.

Hereinbefore, the glass composition of the above-described optical glass has been described. Next, the glass properties of the above-described optical glass will be described.

The above-described optical glass is an optical glass having low-dispersion properties, and its Abbe's number is 72 or more. The Abbe's number is preferably 72.2 or more, and more preferably 72.5 or more. However, the Abbe's number is set to be less than 80 in view of the glass stability.

The above-described optical glass is a glass having the high refractive index as well as the low-dispersion properties. The following formula (A) is satisfied between the refractive index nd and the Abbe's number νd.

$$nd \geq 2.179 - 0.0085 \times vd \quad (A)$$

As described above, the lower limit of the refractive index nd is defined by formula (A) in the relationship between the refractive index nd and the Abbe's number νd.

The upper limit of the refractive index nd is for example 1.62 or less, and preferably 1.60 or less in view of the glass stability.

The above-described optical glass may exhibit excellent devitrification resistance, in addition to having a high refractive index and low-dispersion properties.

A liquidus temperature may be used as one of indexes of the devitrification resistance. The above-described optical glass may have the liquidus temperature of e.g. 850 degrees Celsius or less, or the liquidus temperature of 800 degrees Celsius or less. Moreover, the lower limit of the liquidus temperature of the above-described optical glass is determined by itself from the glass composition without being particularly limited.

Further, it is possible to inhibit the striae from occurring due to the volatilization and to reduce a change in optical properties by lowering the temperature when the molten glass is discharged.

Furthermore, it is possible to inhibit a crucible where a melting operation is performed from being corroded by the glass, by lowering the liquidus temperature. As a result, it is possible to prevent substances such as platinum that is a constituent of the crucible from being included in the glass by the corrosion and leading to foreign matter, or from being dissolved as ions and leading to the coloring of the glass.

As for the devitrification resistance, particularly the properties of rendering crystals to be precipitated with difficulty during the reheat pressing, the higher the crystallization temperature Tc for the glass transition temperature Tg is, the more excellent the devitrification resistance of the optical glass is. The reason is because a heating operation during the reheat pressing is often performed around the glass transition temperature. As for the devitrification resistance, the above-described optical glass may have the devitrification resistance satisfying the following formula (1).

$$120 \text{ degrees Celsius} \leq (Tc - Tg) \quad (1)$$

The following formula (1) is preferably the following formula (2), more preferably the following formula (3), and even more preferably the following formula (4).

$$140 \text{ degrees Celsius} \leq (Tc-Tg) \quad (2)$$

$$150 \text{ degrees Celsius} \leq (Tc-Tg) \quad (3)$$

$$160 \text{ degrees Celsius} \leq (Tc-Tg) \quad (4)$$

To obtain good press formability, the glass transition temperature is preferably low, and preferably for example 550 degrees Celsius or less.

The optical glass may have an anomalous partial dispersibility. The optical glass having the anomalous partial dispersibility is suitable as a glass for high-order chromatic aberration correction.

As described above, the optical glass is a glass that has the high refractive index and the low-dispersion properties and is suitable for any of the direct press method, the reheat press method and the precision press-forming method.

In order to obtain an intended glass composition, raw materials, namely, phosphate, fluoride, oxide and others are weighed, blended, and sufficiently mixed with each other to form a mixed batch, are heated and melted in a melting vessel, and then are defoamed and stirred to make homogeneous molten glass containing no foam. By forming the molten glass, the optical glass may be obtained. Specifically, the optical glass may be made using a known melting method.

[Optical Element Blank, Glass Material for Press Forming, and Process for Producing the Same]

Another aspect of the present invention relates to an optical element blank made of the above-described optical glass; a glass material for press forming made of the above-described optical glass; a process for producing the glass material for press forming, having the step of forming the above-described optical glass into the glass material for press forming; and a process for producing an optical element blank, having the step of producing the optical element blank by press forming using a press-forming mold, in the state where the above-described glass material for press forming is heated to be softened.

The optical element blank is an optical element preform that is similar to the shape of an intended optical element and adds a processing margin such as a polishing margin to the shape of the optical element. The optical element is finished at least by polishing a surface of the optical element blank. When the glass material for press forming made of the above-described optical glass is heated to be softened and then is subjected to press forming using the press-forming mold, the optical element blank may be produced. Since the above-described optical glass may exhibit the excellent devitrification resistance, it is possible to prevent the crystals in the glass from being precipitated by the heating operation during the press-forming.

Both the heating and press-forming operations for the glass material for press forming may be performed in the atmosphere. For example, if a powder release agent such as boron nitride is uniformly applied to the surface of the glass material for press forming and is heated to be press-formed, it is possible to smoothly extend the glass along the forming surface of the press-forming mold, in addition to reliably preventing fusion between the glass and the forming mold. Annealing is performed after the press-forming to reduce strain in the glass, so that it is possible to obtain a homogeneous optical element blank.

On the other hand, the glass material for press forming is also referred to as a preform, and includes a material (hereinafter referred to as a "material 1") that is subjected to press-forming without machining, and a material (hereinafter referred to as a "material 2") that is subjected to press-forming by performing the known machining.

For example, the above-described optical glass may be formed into the glass material for press forming by the following exemplified methods.

(1) method of forming a glass plate by casting molten glass into a mold (hereinafter referred to as "method 1");

(2) method of manufacturing a plurality of glass pieces, called cut pieces, by annealing the glass plate manufactured by method 1 and then cutting it to a desired size (hereinafter referred to as "method 2");

(3) method of barrel polishing the plurality of glass pieces manufactured by method 2 (hereinafter referred to as "method 3");

(4) method of flowing molten glass down from a pipe, receiving the molten glass in a forming mold and thereby forming a glass mass (hereinafter referred to as "method 4");

(5) method of annealing the glass mass obtained by method 4 and then barrel polishing the annealed glass mass (hereinafter referred to as "method 5").

Examples of the above-described material 1 may include the glass material manufactured by the method 3, 4 and 5. Further, examples of the material 2 may include the material manufactured by the method 1, 2 and 4.

[Optical Element and Producing Process Thereof]

Another aspect of the present invention relates to an optical element made of the above-described optical glass; a process for producing an optical element having the step of making the optical element at least by polishing the above-described optical element blank (hereinafter referred to as "method A"); and a process for producing an optical element having the step of making the optical element by performing precision press-forming using a press-forming mold, in the state where the above-described glass material for press forming is heated to be softened (hereinafter referred to as "method B").

In method A, the polishing employs the known method, and the surface of the optical element subjected to the polishing is sufficiently cleaned or dried, so that it is possible to obtain an optical element that is high in both internal quality and surface quality. Method A is suitable as a method for manufacturing the optical element such as various spherical lenses or prisms. The optical element blank may be subjected to grinding by the known method prior to the polishing step.

In method B, the precision press-forming is a method that is also referred to as mold optics forming and forms the optical functional face of the optical element by transferring the forming surface of the press-forming mold. Here, a face causing light beams of the optical element to be transmitted, refracted, diffracted, or reflected is referred to as an optical functional face. For example, when taking a lens as an example, a lens face such as an aspherical face of an aspherical lens or a spherical face of a spherical lens corresponds to the optical functional face. The precision press-forming method is a method of forming the optical functional face through press forming by precisely transferring the forming surface of the press-forming mold to the glass. That is, it is unnecessary to add machining such as grinding or polishing so as to finish the optical functional face. The precision press-forming method is suitable to produce the optical element such as a lens, a lens array, a diffraction grid or a prism, and is optimal as a method particularly for producing the aspherical lens under high productivity.

According to an embodiment of the precision press-forming method, a preform having a clean surface is reheated such that the viscosity of the glass constituting the preform is in the range of $10^5$ to $10^{11}$ Pa·s, and the reheated preform is subjected to press-forming by the forming mold having upper and lower molds. A release film may be formed on the forming surface of the forming mold as necessary. Further, the press-forming is preferably performed under the atmosphere of nitrogen gas or inert gas to prevent the forming surface of the forming mold from being oxidized. A press-formed product is taken out from the forming mold and is gradually cooled as necessary. If the formed product is an optical element such as the lens, an optical thin film may be coated on the surface as necessary.

Thus, it is possible to manufacture the optical element, such as the lens, the lens array, the diffraction grid or the prism, which is made of the optical glass suitable for various forming methods.

EXAMPLES

Hereinafter, the present invention will be further described with reference to examples. However, the present invention is not limited to aspects illustrated in examples.

1. Examples and Comparative Examples of Optical Glass and Precision Press-Forming Preform In order to obtain the optical glass having the composition shown in Table 1, 100 to 300 g of the raw materials of the glass such as phosphate, fluoride or oxide corresponding to each glass component was weighed in a predetermined ratio and was sufficiently mixed to make a blended batch. After this was put into the platinum crucible and was covered, it was melted for one to three hours in the air or in the nitrogen atmosphere while being stirred at 850 to 1100 degrees Celsius. After the melting, the glass melt was poured into a carbon mold of 40×70×15 mm, was allowed to be cooled to the glass transition temperature and then was immediately put into an annealing furnace. Subsequently, it was subjected to annealing for about one hour in the glass transition temperature and was allowed to be cooled to room temperature in the furnace. Consequently, each of optical glasses having the compositions of No. 1 to No. 35 was cast.

By the following method, the refractive index, the Abbe's number, the glass transition temperature Tg, the crystallization temperature Tc, and the liquidus temperature of each optical glass were measured.

Measuring Method (1) Refractive Index nd and Abbe's Number vd

They were measured for an optical glass obtained in the state where a gradual cooling rate was set to −30 degrees Celsius/hr.

(2) Glass Transition Temperature Tg

It was measured by a DSC (Differential Scanning Calorimetry) in the state where a heating rate was set to 10 degrees Celsius/min.

(3) Crystallization Temperature Tc

It was measured by the DSC (Differential Scanning Calorimetry) in the state where a heating rate was set to 10 degrees Celsius/min. Further, as a glass sample is heated, the temperature of a first exothermic peak appearing in a DSC curve is defined as the crystallization temperature Tc.

(4) Liquidus Temperature (LT)

After the glass sample was put into a test furnace heated to a predetermined temperature, was maintained for two hours and then cooled, the interior of the glass was observed by a 100× optical microscope and the liquidus temperature was determined based on the presence or absence of crystals.

(5) Glass Composition

The content of each component was determined by an inductively coupled plasma atomic emission method (ICP-AES method) or an ion chromatography method.

The measured results are shown in Table 1. As for the liquidus temperature, in Table 1, the liquidus temperature of Nos. 2 to 8, Nos. 19 to 25, Nos. 34 and 35 glasses was 800 degrees Celsius or less. The liquidus temperature of other glasses in Table 1 was 850 degrees Celsius or less.

TABLE 1

| No. | $P^{5+}$ | $Al^{3+}$ | $Ba^{2+}$ | $Mg^{2+}$ | $Ca^{2+}$ | $Sr^{2+}$ | $Zn^{2+}$ | $Li^+$ | $Na^+$ | $K^+$ | $Y^{3+}$ | $La^{3+}$ | $Gd^{3+}$ | $B^{3+}$ | Total |
|---|---|---|---|---|---|---|---|---|---|---|---|---|---|---|---|
| 1 | 29.5 | 22.9 | 26.2 | 2.3 | 5.9 | 5.5 | 0.0 | 7.1 | 0.2 | 0.0 | 0.4 | 0.0 | 0.0 | 0.0 | 100.0 |
| 2 | 30.0 | 21.5 | 24.0 | 4.0 | 6.0 | 6.0 | 0.0 | 8.0 | 0.0 | 0.0 | 0.5 | 0.0 | 0.0 | 0.0 | 100.0 |
| 3 | 30.0 | 23.5 | 31.5 | 4.0 | 0.0 | 2.0 | 0.0 | 8.0 | 0.0 | 0.0 | 1.0 | 0.0 | 0.0 | 0.0 | 100.0 |
| 4 | 28.2 | 23.8 | 23.2 | 4.4 | 6.6 | 8.6 | 0.0 | 4.2 | 0.0 | 0.0 | 1.0 | 0.0 | 0.0 | 0.0 | 100.0 |
| 5 | 28.1 | 24.8 | 25.2 | 3.0 | 7.1 | 6.6 | 0.0 | 4.2 | 0.0 | 0.0 | 1.0 | 0.0 | 0.0 | 0.0 | 100.0 |
| 6 | 30.0 | 23.5 | 31.5 | 2.0 | 3.0 | 1.0 | 0.0 | 8.0 | 0.0 | 0.0 | 1.0 | 0.0 | 0.0 | 0.0 | 100.0 |
| 7 | 30.0 | 23.5 | 31.5 | 2.0 | 3.0 | 1.0 | 0.0 | 8.0 | 0.0 | 0.0 | 1.0 | 0.0 | 0.0 | 0.0 | 100.0 |
| 8 | 28.0 | 21.5 | 29.5 | 4.0 | 4.0 | 4.0 | 0.0 | 8.0 | 0.0 | 0.0 | 1.0 | 0.0 | 0.0 | 0.0 | 100.0 |
| 9 | 28.0 | 21.5 | 29.5 | 4.0 | 4.0 | 4.0 | 0.0 | 8.0 | 0.0 | 0.0 | 1.0 | 0.0 | 0.0 | 0.0 | 100.0 |
| 10 | 28.6 | 19.9 | 30.0 | 4.1 | 4.1 | 4.1 | 0.0 | 8.2 | 0.0 | 0.0 | 1.0 | 0.0 | 0.0 | 0.0 | 100.0 |
| 11 | 29.2 | 22.4 | 30.7 | 0.0 | 4.2 | 4.2 | 0.0 | 8.3 | 0.0 | 0.0 | 1.0 | 0.0 | 0.0 | 0.0 | 100.0 |
| 12 | 29.2 | 22.4 | 30.7 | 4.2 | 0.0 | 4.2 | 0.0 | 8.3 | 0.0 | 0.0 | 1.0 | 0.0 | 0.0 | 0.0 | 100.0 |
| 13 | 29.2 | 22.4 | 30.7 | 4.2 | 4.2 | 0.0 | 0.0 | 8.3 | 0.0 | 0.0 | 1.0 | 0.0 | 0.0 | 0.0 | 100.0 |
| 14 | 29.1 | 22.4 | 26.6 | 4.2 | 4.2 | 4.2 | 0.0 | 8.3 | 0.0 | 0.0 | 1.0 | 0.0 | 0.0 | 0.0 | 100.0 |
| 15 | 27.6 | 21.1 | 28.9 | 3.9 | 3.9 | 3.9 | 0.0 | 7.8 | 0.0 | 0.0 | 2.9 | 0.0 | 0.0 | 0.0 | 100.0 |
| 16 | 27.5 | 21.1 | 29.0 | 3.9 | 3.9 | 3.9 | 0.0 | 7.8 | 0.0 | 0.0 | 0.0 | 0.0 | 2.9 | 0.0 | 100.0 |
| 17 | 28.0 | 21.5 | 29.5 | 4.0 | 4.0 | 4.0 | 0.0 | 6.0 | 2.0 | 0.0 | 1.0 | 0.0 | 0.0 | 0.0 | 100.0 |
| 18 | 27.5 | 21.1 | 28.9 | 3.9 | 3.9 | 3.9 | 2.0 | 7.8 | 0.0 | 0.0 | 1.0 | 0.0 | 0.0 | 0.0 | 100.0 |
| 19 | 27.0 | 22.9 | 28.0 | 4.3 | 6.4 | 6.4 | 0.0 | 4.0 | 0.0 | 0.0 | 1.0 | 0.0 | 0.0 | 0.0 | 100.0 |
| 20 | 28.2 | 23.8 | 25.2 | 4.4 | 6.6 | 6.6 | 0.0 | 4.2 | 0.0 | 0.0 | 1.0 | 0.0 | 0.0 | 0.0 | 100.0 |
| 21 | 28.2 | 23.8 | 23.2 | 4.4 | 6.6 | 8.6 | 0.0 | 4.2 | 0.0 | 0.0 | 1.0 | 0.0 | 0.0 | 0.0 | 100.0 |
| 22 | 28.1 | 24.8 | 25.2 | 3.0 | 7.1 | 6.6 | 0.0 | 4.2 | 0.0 | 0.0 | 1.0 | 0.0 | 0.0 | 0.0 | 100.0 |
| 23 | 27.6 | 25.3 | 25.2 | 3.0 | 7.1 | 6.6 | 0.0 | 4.2 | 0.0 | 0.0 | 1.0 | 0.0 | 0.0 | 0.0 | 100.0 |
| 24 | 26.6 | 26.3 | 25.2 | 3.0 | 7.1 | 6.6 | 0.0 | 4.2 | 0.0 | 0.0 | 1.0 | 0.0 | 0.0 | 0.0 | 100.0 |
| 25 | 25.6 | 27.3 | 25.2 | 3.0 | 7.1 | 6.6 | 0.0 | 4.2 | 0.0 | 0.0 | 1.0 | 0.0 | 0.0 | 0.0 | 100.0 |

TABLE 1-continued

| No. | | | | | | | | | | | | | | | |
|---|---|---|---|---|---|---|---|---|---|---|---|---|---|---|---|
| 26 | 26.6 | 26.3 | 25.2 | 3.0 | 7.1 | 6.6 | 0.0 | 4.2 | 0.0 | 0.0 | 1.0 | 0.0 | 0.0 | 0.0 | 100.0 |
| 27 | 26.6 | 26.3 | 25.2 | 3.0 | 7.1 | 6.6 | 0.0 | 4.2 | 0.0 | 0.0 | 1.0 | 0.0 | 0.0 | 0.0 | 100.0 |
| 28 | 28.0 | 21.5 | 29.5 | 4.0 | 4.0 | 4.0 | 0.0 | 8.0 | 0.0 | 0.0 | 1.0 | 0.0 | 0.0 | 0.0 | 100.0 |
| 29 | 21.6 | 31.3 | 25.2 | 3.0 | 7.1 | 6.6 | 0.0 | 4.2 | 0.0 | 0.0 | 1.0 | 0.0 | 0.0 | 0.0 | 100.0 |
| 30 | 25.0 | 22.4 | 30.7 | 4.2 | 4.2 | 4.2 | 0.0 | 8.3 | 0.0 | 0.0 | 1.0 | 0.0 | 0.0 | 0.0 | 100.0 |
| 31 | 26.9 | 20.7 | 32.0 | 3.9 | 3.9 | 3.9 | 0.0 | 7.7 | 0.0 | 0.0 | 1.0 | 0.0 | 0.0 | 0.0 | 100.0 |
| 32 | 27.1 | 24.5 | 32.9 | 2.1 | 3.1 | 1.0 | 0.0 | 8.3 | 0.0 | 0.0 | 1.0 | 0.0 | 0.0 | 0.0 | 100.0 |
| 33 | 32.6 | 25.5 | 34.2 | 2.2 | 3.3 | 1.1 | 0.0 | 0.0 | 0.0 | 0.0 | 1.1 | 0.0 | 0.0 | 0.0 | 100.0 |
| 34 | 26.8 | 28.3 | 28.2 | 3.0 | 4.0 | 6.7 | 0.0 | 2.0 | 0.0 | 0.0 | 1.0 | 0.0 | 0.0 | 0.0 | 100.0 |
| 35 | 26.7 | 26.3 | 32.2 | 3.0 | 0.0 | 6.6 | 0.0 | 2.2 | 0.0 | 0.0 | 3.0 | 0.0 | 0.0 | 0.0 | 100.0 |

| No. | anion component (anion %) | | | | $R^{2+}$ | $Ba^{2+} + R^{2+}$ | $R'^{+}$ | $RE^{3+}$ | $Ba^{2+} + R^{2+} + R'^{+}$ | $P^{5+} + Al^{3+} + P^{5+}$ | $Al^{3+}/(Ba^{2+} + R^{2+})$ | $Al^{3+}/(Ba^{2+} + R^{2+})$ | $Ba^{2+}/(Ba^{2+} + R^{2+})$ | $O^{2-}/P^{5+}$ |
|---|---|---|---|---|---|---|---|---|---|---|---|---|---|---|
| | $O^{2-}$ | $F^{-}$ | $Cl^{-}$ | Total | | | | | | | | | | |
| 1 | 56.0 | 43.8 | 0.2 | 100.0 | 13.7 | 39.9 | 7.3 | 0.4 | 99.6 | 0.78 | 0.57 | 0.66 | 3.69 |
| 2 | 58.3 | 41.5 | 0.2 | 100.0 | 16.0 | 40.0 | 8.0 | 0.5 | 99.5 | 0.72 | 0.54 | 0.60 | 3.73 |
| 3 | 58.2 | 41.6 | 0.2 | 100.0 | 6.0 | 37.5 | 8.0 | 1.0 | 99.0 | 0.78 | 0.63 | 0.84 | 3.76 |
| 4 | 55.3 | 44.5 | 0.2 | 100.0 | 19.6 | 42.8 | 4.2 | 1.0 | 99.0 | 0.84 | 0.56 | 0.54 | 3.86 |
| 5 | 54.6 | 45.2 | 0.2 | 100.0 | 16.7 | 41.9 | 4.2 | 1.0 | 99.0 | 0.88 | 0.59 | 0.60 | 3.84 |
| 6 | 58.2 | 41.6 | 0.2 | 100.0 | 6.0 | 37.5 | 8.0 | 1.0 | 99.0 | 0.78 | 0.63 | 0.84 | 3.76 |
| 7 | 55.8 | 44.0 | 0.2 | 100.0 | 6.0 | 37.5 | 8.0 | 1.0 | 99.0 | 0.78 | 0.63 | 0.84 | 3.66 |
| 8 | 54.8 | 45.0 | 0.2 | 100.0 | 12.0 | 41.5 | 8.0 | 1.0 | 99.0 | 0.77 | 0.52 | 0.71 | 3.77 |
| 9 | 49.9 | 49.9 | 0.2 | 100.0 | 12.0 | 41.5 | 8.0 | 1.0 | 99.0 | 0.77 | 0.52 | 0.71 | 3.55 |
| 10 | 54.9 | 44.9 | 0.2 | 100.0 | 12.3 | 42.3 | 8.2 | 1.0 | 99.0 | 0.70 | 0.47 | 0.71 | 3.70 |
| 11 | 54.9 | 44.9 | 0.2 | 100.0 | 8.4 | 39.1 | 8.3 | 1.0 | 99.0 | 0.77 | 0.57 | 0.79 | 3.68 |
| 12 | 54.9 | 44.9 | 0.2 | 100.0 | 8.4 | 39.1 | 8.3 | 1.0 | 99.0 | 0.77 | 0.57 | 0.79 | 3.68 |
| 13 | 54.9 | 44.9 | 0.2 | 100.0 | 8.4 | 39.1 | 8.3 | 1.0 | 99.0 | 0.77 | 0.57 | 0.79 | 3.68 |
| 14 | 54.9 | 44.9 | 0.2 | 100.0 | 12.6 | 39.2 | 8.3 | 1.0 | 99.0 | 0.77 | 0.57 | 0.68 | 3.68 |
| 15 | 54.9 | 44.9 | 0.2 | 100.0 | 11.7 | 40.6 | 7.8 | 2.9 | 97.1 | 0.76 | 0.52 | 0.71 | 3.85 |
| 16 | 54.9 | 44.9 | 0.2 | 100.0 | 11.7 | 40.7 | 7.8 | 2.9 | 97.1 | 0.77 | 0.52 | 0.71 | 3.85 |
| 17 | 54.9 | 44.9 | 0.2 | 100.0 | 12.0 | 41.5 | 8.0 | 1.0 | 99.0 | 0.77 | 0.52 | 0.71 | 3.78 |
| 18 | 54.9 | 44.9 | 0.2 | 100.0 | 13.7 | 42.6 | 7.8 | 1.0 | 99.0 | 0.77 | 0.50 | 0.68 | 3.83 |
| 19 | 52.9 | 46.9 | 0.2 | 100.0 | 17.1 | 45.1 | 4.0 | 1.0 | 99.0 | 0.85 | 0.51 | 0.62 | 3.86 |
| 20 | 54.9 | 44.9 | 0.2 | 100.0 | 17.6 | 42.8 | 4.2 | 1.0 | 99.0 | 0.84 | 0.56 | 0.59 | 3.84 |
| 21 | 55.2 | 44.6 | 0.2 | 100.0 | 19.6 | 42.8 | 4.2 | 1.0 | 99.0 | 0.84 | 0.56 | 0.54 | 3.86 |
| 22 | 55.0 | 44.8 | 0.2 | 100.0 | 16.7 | 41.9 | 4.2 | 1.0 | 99.0 | 0.88 | 0.59 | 0.60 | 3.86 |
| 23 | 54.1 | 45.7 | 0.2 | 100.0 | 16.7 | 41.9 | 4.2 | 1.0 | 99.0 | 0.92 | 0.60 | 0.60 | 3.88 |
| 24 | 53.6 | 46.2 | 0.2 | 100.0 | 16.7 | 41.9 | 4.2 | 1.0 | 99.0 | 0.99 | 0.63 | 0.60 | 3.97 |
| 25 | 53.2 | 46.6 | 0.2 | 100.0 | 16.7 | 41.9 | 4.2 | 1.0 | 99.0 | 1.07 | 0.65 | 0.60 | 4.08 |
| 26 | 44.4 | 55.4 | 0.2 | 100.0 | 16.7 | 41.9 | 4.2 | 1.0 | 99.0 | 0.99 | 0.63 | 0.60 | 3.50 |
| 27 | 40.8 | 59.0 | 0.2 | 100.0 | 16.7 | 41.9 | 4.2 | 1.0 | 99.0 | 0.99 | 0.63 | 0.60 | 3.30 |
| 28 | 59.9 | 39.9 | 0.2 | 100.0 | 12.0 | 41.5 | 8.0 | 1.0 | 99.0 | 0.77 | 0.52 | 0.71 | 3.99 |
| 29 | 41.0 | 58.8 | 0.2 | 100.0 | 16.7 | 41.9 | 4.2 | 1.0 | 99.0 | 1.45 | 0.75 | 0.60 | 3.94 |
| 30 | 54.9 | 44.9 | 0.2 | 100.0 | 12.6 | 43.3 | 8.3 | 1.0 | 99.0 | 0.90 | 0.52 | 0.71 | 4.11 |
| 31 | 54.9 | 44.9 | 0.2 | 100.0 | 11.7 | 43.7 | 7.7 | 1.0 | 99.0 | 0.77 | 0.47 | 0.73 | 3.88 |
| 32 | 53.8 | 46.0 | 0.2 | 100.0 | 6.2 | 39.1 | 8.3 | 1.0 | 99.0 | 0.90 | 0.63 | 0.84 | 3.85 |
| 33 | 55.8 | 44.0 | 0.2 | 100.0 | 6.6 | 40.8 | 0.0 | 1.1 | 98.9 | 0.78 | 0.63 | 0.84 | 3.59 |
| 34 | 52.3 | 47.5 | 0.2 | 100.0 | 13.7 | 41.9 | 2.0 | 1.0 | 99.0 | 1.06 | 0.68 | 0.67 | 3.95 |
| 35 | 50.3 | 49.5 | 0.2 | 100.0 | 9.6 | 41.8 | 2.2 | 3.0 | 97.0 | 0.99 | 0.63 | 0.77 | 3.86 |

| No. | νd | nd | 2.179 − 0.0085 × νd | Tg (° C.) | Tc (° C.) | Tc − Tg (° C.) |
|---|---|---|---|---|---|---|
| 1 | 74.66 | 1.54950 | 1.54439 | 484 | 664 | 180 |
| 2 | 74.50 | 1.55357 | 1.54575 | 479 | 950 | 471 |
| 3 | 73.56 | 1.55831 | 1.55374 | 498 | 644 | 146 |
| 4 | 74.62 | 1.55042 | 1.54473 | 508 | 688 | 180 |
| 5 | 74.94 | 1.55009 | 1.54201 | 507 | 681 | 174 |
| 6 | 73.38 | 1.55916 | 1.55527 | 492 | 642 | 150 |
| 7 | 74.52 | 1.55148 | 1.54558 | 478 | 633 | 155 |
| 8 | 74.20 | 1.55250 | 1.5483 | 476 | 631 | 155 |
| 9 | 76.18 | 1.53592 | 1.53147 | 445 | 604 | 159 |
| 10 | 73.98 | 1.55128 | 1.55017 | 458 | 630 | 172 |
| 11 | 74.15 | 1.55130 | 1.548725 | 466 | 625 | 159 |
| 12 | 74.71 | 1.54898 | 1.543965 | 473 | 630 | 157 |
| 13 | 74.70 | 1.54815 | 1.54405 | 467 | 637 | 170 |
| 14 | 75.01 | 1.54535 | 1.541415 | 466 | 640 | 174 |
| 15 | 73.63 | 1.55653 | 1.553145 | 476 | 632 | 156 |
| 16 | 73.17 | 1.55864 | 1.557055 | 482 | 657 | 175 |
| 17 | 74.12 | 1.55124 | 1.54898 | 476 | 634 | 158 |
| 18 | 73.52 | 1.55475 | 1.55408 | 473 | 631 | 158 |
| 19 | 74.69 | 1.55045 | 1.544135 | 503 | 653 | 150 |
| 20 | 74.87 | 1.55058 | 1.542605 | 505 | 677 | 172 |
| 21 | 74.86 | 1.55019 | 1.54269 | 506 | 772 | 266 |
| 22 | 74.80 | 1.55163 | 1.5432 | 510 | 687 | 177 |
| 23 | 74.91 | 1.55160 | 1.542231 | 518 | 680 | 162 |
| 24 | 74.91 | 1.55083 | 1.542248 | 521 | 683 | 162 |
| 25 | 75.01 | 1.54942 | 1.541449 | 512 | 673 | 161 |
| 26 | 78.60 | 1.52176 | 1.5108915 | 464 | 627 | 163 |
| 27 | 79.71 | 1.51405 | 1.5014735 | 451 | 608 | 157 |

TABLE 1-continued

| | | | | | | |
|---|---|---|---|---|---|---|
| 28 | 72.24 | 1.56783 | 1.56496 | 506 | 632 | 126 |
| 29 | 79.70 | 1.52181 | 1.50155 | 486 | 615 | 129 |
| 30 | 73.39 | 1.55973 | 1.555185 | 482 | 605 | 123 |
| 31 | 73.36 | 1.55809 | 1.55544 | 476 | 606 | 130 |
| 32 | 75.24 | 1.55419 | 1.53946 | 492 | 626 | 134 |
| 33 | 74.74 | 1.55142 | 1.54371 | 537 | 658 | 121 |
| 34 | 75.55 | 1.54981 | 1.536791 | 545 | 686 | 141 |
| 35 | 75.20 | 1.55007 | 1.5398 | 533 | 659 | 126 |

Next, in order to obtain the glass having the composition shown in Table 2, the raw materials of the glass were blended, so that a glass (comparative example) was manufactured in the same manner as the above-mentioned method.

Further, the compositions of Nos. 1 to 5 in Table 2 were determined such that at least one of the molar ratios $Al^{3+}/P^{5+}$, $Al^{3+}/(Ba^{2+}+R^{2+})$, $Ba^{2+}/(Ba^{2+}+R^{2+})$ and the total content of $P^{5+}$, $Al^{3+}$, $Ba^{2+}$, $R^{2+}$ and $R'^{+}$ was out of a range defined in the above-described aspect.

In Table 2, No. 6 corresponds to Example 5 of Patent Document 1, No. 7 corresponds to Example 1 of Patent Document 3, No. 8 corresponds to Example 6 of Patent Document 3, and No. 9 corresponds to Example 1 of Patent Document 4.

Hereinafter, respective compositions of Nos. 1 to 9 described in Table 2 will be described.

The molar ratio $Ba^{2+}/(Ba^{2+}+R^{2+})$ of No. 1 is less than that of the optical glass according to the above-described aspect, while the molar ratio $Ba^{2+}/(Ba^{2+}+R^{2+})$ of No. 2 is greater than that of the optical glass according to the above-described aspect. In Nos. 1 and 2, crystals were precipitated and devitrified when the glass melt was cast.

The molar ratio $Al^{3+}/P^{5+}$ of No. 3 is greater than that of the optical glass according to the above-described aspect. This glass has the Abbe's number νd less than 72, and does not satisfy formula (A).

The molar ratio $Ba^{2+}/(Ba^{2+}+R^{2+})$ of No. 4 is greater than that of the optical glass according to the above-described aspect. If this glass was reheated to be softened, crystals were precipitated and devitrified.

The molar ratio $Al^{3+}/P^{5+}$ of No. 5 is less than that of the optical glass according to the above-described aspect. In No. 5, the striae was pronounced and it was impossible to obtain homogeneous glass.

No. 6 contains a large amount of $RE^{3+}$, and the total content of $P^{5+}$, $Al^{3+}$, $Ba^{2+}$, $R^{2+}$ and $R'^{+}$ thereof was less than that of the optical glass according to the above-described aspect. In No. 6, a lot of unmolten substances was observed in the obtained glass and thereby it is impossible to obtain homogeneous glass.

The molar ratio $Al^{3+}/P^{5+}$ of No. 7 is less than that of the optical glass according to the above-described aspect. In No. 7, the pronounced striae occurred in the glass. Therefore, it was impossible to measure optical properties.

The molar ratio $Ba^{2+}/(Ba^{2+}+R^{2+})$ of No. 8 is less than that of the optical glass according to the above-described aspect. In No. 8, when the glass melt was cast, crystals were precipitated and devitrified.

All of the molar ratios $Al^{3+}/P^{5+}$, $Al^{3+}/(Ba^{2+}+R^{2+})$ and $Ba^{2+}/(Ba^{2+}+R^{2+})$ of No. 9 are less than those of the optical glass according to the above-described aspect. This glass had the Abbe's number νd less than 72, did not satisfy formula (A), was noticeable in volatilization from the glass melt, and occurred the pronounced striae on the surface of the obtained glass.

TABLE 2

| | cation component (cation %) | | | | | | | | | | | | | | |
|---|---|---|---|---|---|---|---|---|---|---|---|---|---|---|---|
| No. | $P^{5+}$ | $Al^{3+}$ | $Ba^{2+}$ | $Mg^{2+}$ | $Ca^{2+}$ | $Sr^{2+}$ | $Zn^{2+}$ | $Li^+$ | $Na^+$ | $K^+$ | $Y^{3+}$ | $La^{3+}$ | $Gd^{3+}$ | $B^{3+}$ | Total |
| 1 | 30 | 23.5 | 18.5 | 5 | 7 | 7 | 0 | 8 | 0 | 0 | 1 | 0 | 0 | 0 | 100 |
| 2 | 30 | 21.5 | 36 | 4 | 0 | 0 | 0 | 8 | 0 | 0 | 0.5 | 0 | 0 | 0 | 100 |
| 3 | 30 | 13.5 | 33.5 | 4 | 0 | 0 | 0 | 18 | 0 | 0 | 1 | 0 | 0 | 0 | 100 |
| 4 | 30 | 23.5 | 33.5 | 4 | 0 | 0 | 0 | 8 | 0 | 0 | 1 | 0 | 0 | 0 | 100 |
| 5 | 30.77 | 20.67 | 28.36 | 3.85 | 3.85 | 3.85 | 0 | 7.69 | 0 | 0 | 0.96 | 0 | 0 | 0 | 100 |
| 6 | 28.5 | 9.5 | 28.6 | 0 | 0 | 18 | 0 | 0 | 0 | 0 | 2 | 0 | 13.3 | 0 | 99.9 |
| 7 | 31.9 | 21.1 | 17.6 | 4.4 | 8.8 | 13.2 | 0 | 1.5 | 0 | 0 | 0 | 1.5 | 0 | 0 | 100 |
| 8 | 25.8 | 19.9 | 20.4 | 5.1 | 10.2 | 15.3 | 0 | 1.7 | 0 | 0 | 0 | 1.5 | 0 | 0 | 99.9 |
| 9 | 45.3 | 7 | 17.8 | 9.1 | 5.6 | 6.9 | 3.3 | 1.1 | 0 | 0 | 0 | 3.9 | 0 | 0 | 100 |

| | anion component (anion %) | | | | | | | $P^{5+}+Al^{3+}+$ | $Al^{3+}/$ | $Al^{3+}/$ | $Ba^{2+}/$ | | | |
|---|---|---|---|---|---|---|---|---|---|---|---|---|---|---|
| No. | $O^{2-}$ | $F^-$ | $Cl^-$ | Total | $R^{2+}$ | $R'^{+}$ | $RE^{3+}$ | $Ba^{2+}+R^{2+}+R'^{+}$ | $P^{5+}$ | $(Ba^{2+}+R^{2+})$ | $(Ba^{2+}+R^{2+})$ | $O^{2-}/P^{5+}$ | νd | nd |
| 1 | 59 | 40.9 | 0.1 | 100 | 19 | 8 | 1 | 99 | 0.78 | 0.63 | 0.49 | 3.79 | — | — |
| 2 | 58.34 | 41.46 | 0.2 | 100 | 4 | 8 | 0.5 | 99.5 | 0.72 | 0.54 | 0.90 | 3.73 | — | — |
| 3 | 58.19 | 41.61 | 0.2 | 100 | 4 | 18 | 1 | 99 | 0.45 | 0.36 | 0.89 | 3.51 | 71.58 | 1.55761 |
| 4 | 58.19 | 41.61 | 0.2 | 100 | 4 | 8 | 1 | 99 | 0.78 | 0.63 | 0.89 | 3.76 | 73.94 | 1.56125 |
| 5 | 54.8 | 45 | 0.2 | 100 | 11.55 | 7.69 | 0.96 | 99.04 | 0.67 | 0.52 | 0.71 | 3.52 | — | — |
| 6 | 57.5 | 42.5 | 0 | 100 | 18 | 0 | 15.3 | 84.60 | 0.33 | 0.20 | 0.61 | 3.97 | 71.7 | 1.57145 |
| 7 | 62.7 | 37.3 | 0 | 100 | 26.4 | 1.5 | 1.5 | 98.5 | 0.66 | 0.48 | 0.40 | 3.83 | — | — |
| 8 | 49.8 | 50.2 | 0 | 100 | 30.6 | 1.7 | 1.5 | 98.4 | 0.77 | 0.39 | 0.40 | 3.83 | 75.6 | 1.5433 |
| 9 | 69.6 | 30.4 | 0 | 100 | 24.9 | 1.1 | 3.9 | 96.1 | 0.15 | 0.16 | 0.42 | 3.13 | 71.2 | 1.5796 |

Next, high-quality and homogenized high-molten glass from which the optical glass of each example shown in Table 1 was obtained was continuously discharged from a pipe made of platinum alloy. The discharged molten glass was dropped from a pipe outlet, received in a plurality of preform forming molds in sequence, and was formed into a plurality of spherical preforms by a float-forming method. Further, the temperature of the glass during the discharge was higher by several degrees than the liquidus temperature.

The preform obtained from the optical glass of each example had no crystal that may be observed by the microscope, were transparent and homogeneous. Every preform was not devitrified and had high mass precision.

The preform was manufactured from the optical glass of the example using a drop cutting method, instead of the dropping method. Likewise, no devitrification was observed in the preform obtained by the drop cutting method, and the preform having the high mass precision was obtained. Also, both of the dropping method and the drop cutting method did not leave traces when separating the preform. Even if a platinum pipe was used, like the platinum alloy pipe, the pipe was never damaged by the discharge of the molten glass.

2. Examples of Optical Element

A surface of the above-described preform was coated as necessary, the preform was introduced into a press-forming mold including upper and lower mods made of SiC and a body mold, with a carbon-based release film formed on a forming surface, the forming mold and the preform were heated together under a nitrogen atmosphere to soften the preform, and then precision press-forming was performed to manufacture various lenses made of the above-mentioned glasses, including an aspherical convex meniscus lens, an aspherical concave meniscus lens, an aspherical biconvex lens, and an aspherical biconcave lens. Further, the conditions of the precision press-forming were adjusted in the above-described range.

According to the results of observing various lenses manufactured in this way, scratches, fogging, and damage were never observed on the surface of each lens.

Although a mass-production test for various lenses was conducted by repeating the process, fusion between the glass and the press-forming mold did not occur, and the lens having the high quality in both the surface and the interior was produced with high precision. An anti-reflection film may be coated on the surface of the lens obtained in this way.

Subsequently, the preform that was the same as the above-described preform was heated to be softened, was introduced into the separately pre-heated press-forming mold, and then was subjected to the precision press-forming, thus manufacturing various lenses made of the above-mentioned glasses, including an aspherical convex meniscus lens, an aspherical concave meniscus lens, an aspherical biconvex lens, and an aspherical biconcave lens. Further, the conditions of the precision press-forming were adjusted in the above-described range.

According to the results of observing various lenses manufactured in this way, clouding or the like resulting from phase separation was not observed and scratches, fogging, and damage were never observed on the surface of each lens.

Although a mass-production test for various lenses was conducted by repeating the process, fusion between the glass and the press-forming mold did not occur, and the lens having the high quality in both the surface and the interior was able to be produced with high precision. An anti-reflection film may be coated on the surface of the lens obtained in this way.

By appropriately changing the shape of the forming surface of the press-forming mold, various optical elements such as a prism, a micro-lens, or a lens array may be produced.

These optical elements were made of glass having an anomalous partial dispersibility, and were suitable for high-order chromatic aberration correction.

3. Examples of Optical Element Blank and Optical Element

A clarified and homogenized molten glass from which the glass of each example shown in Table 1 was obtained was prepared, was continuously discharged from a platinum pipe at a constant flow rate, was poured into a mold that was horizontally arranged under the pipe and was open at a sidewall thereof, and was formed into a glass plate having a predetermined width and a predetermined thickness. Then, the formed glass plate was taken out from an opening of the mold. This glass plate was subjected to annealing in an annealing furnace and was reduced in strain, thus obtaining the glass plate made of each optical glass having no striae or foreign matter and having little coloring.

Next, each glass plate was cut vertically and horizontally to obtain a plurality of rectangular parallelepiped-shaped glass pieces having the same dimension. Further, the plurality of glass pieces was subjected to barrel polishing, thus obtaining a press-forming glass gob in conformity with a weight of an intended press-formed product.

Apart from the above-described method, the molten glass was discharged from a platinum nozzle at a constant flow rate, and a plurality of receiving molds were sequentially transferred under the nozzle to sequentially receive a molten glass mass of a predetermined mass. The molten glass mass was formed into a sphere or a rotary body, was subjected to annealing and then barrel polishing, thus obtaining a press-forming glass gob in conformity with a mass of an intended press-formed product.

A powdered release agent, for example, boron nitride powder was applied to an entire surface of the above-described glass gob, was heated by a heater to be softened, was put into a press-forming mold having upper and lower molds, and then was pressed by the press-forming mold, thus forming a lens blank having a shape that approximates to the shape of an intended lens including a margin that was to be removed by grinding and polishing.

Subsequently, each lens blank was annealed to reduce strain. The cooled lens blank was subjected to grinding and polishing, thus obtaining an intended lens. A series of steps was performed in the atmosphere. Each lens obtained in this way possessed excellent light transmittance. An optical multilayered film such as an anti-reflection film may be coated on the lens as necessary.

It is possible to constitute a good optical imaging system using such a lens.

Further, it is possible to produce other optical elements such as a prism, by appropriately setting the shape of the press-forming mold and the volume of the glass gob.

The optical element is made of glass having an anomalous partial dispersibility and is suitable for high-order chromatic aberration correction.

Finally, the above-mentioned aspects will be collectively summarized.

According to an aspect, provided is an optical glass, which contains cationic components including $P^{5+}$, $Al^{3+}$, $Ba^{2+}$, and $R^{2+}$ ($R^{2+}$ is one or more selected from the group consisting of $Mg^{2+}$, $Ca^{2+}$, $Sr^{2+}$, and $Zn^{2+}$) as essential components, and contains anionic components including $O^{2-}$ and $F^-$ as essential components, a total content of $P^{5+}$, $Al^{3+}$, $Ba^{2+}$, $R^{2+}$, and $R'^{+}$ ($R'^{+}$ is one or more selected from the group consisting of $Li^{+}$, $Na^{+}$, and $K^{+}$) in a cationic component proportion being 86% or more, a molar ratio $Al^{3+}/P^{5+}$ being 0.70 or more, a molar ratio $Al^{3+}/(Ba^{2+}+R^{2+})$ being 0.40 or more, and a molar ratio $Ba^{2+}/(Ba^{2+}+R^{2+})$ being in a range of 0.50 to 0.85, and which has an Abbe's number vd of 72 or more but less than 80, a refractive index nd and the Abbe's number vd satisfying the above-described formula (A), so that the optical glass has a high refractive index and low dispersion and thereby the optical glass having excellent devitrification resistance is realized.

The above-described optical glass may exhibit a liquidus temperature of 850 degrees Celsius or less, by adjusting the above-described composition.

The above-described optical glass may exhibit devitrification resistance satisfying the above-described formula (1), by adjusting the above-described composition.

It is preferable that the above-described optical glass satisfies one or more of the following glass compositions to allow more excellent devitrification resistance and a high refractive index/low-dispersion properties to be compatible.

In the cationic component proportion, the $P^{5+}$ content is in the range of 15 to 35%.

The molar ratio $O^{2-}/P^{5+}$ is 3.30 or more.

In the cationic component proportion, the $Al^{3+}$ content is in the range of 18 to 35%.

In the cationic component proportion, the total content of $Ba^{2+}$ and $R^{2+}$ is in the range of 30 to 60%.

In the anionic component proportion, the $O^{2-}$ content is in the range of 40 to 70%, and the $F^{-}$ content is in the range of 30 to 60%.

In the cationic component proportion, the $RE^{3+}$ content is 14% or less.

In the cationic component proportion, the $Li^{+}$ content is 10% or less.

In the cationic component proportion, the $Mg^{2+}$ content is 10% or less.

In the cationic component proportion, the $Ca^{2+}$ content is 15% or less.

In the cationic component proportion, the $Sr^{2+}$ content is 15% or less.

In the cationic component proportion, the $Ba^{2+}$ content is in the range of 18 to 43%.

Since the above-described optical glass may suppressed the devitrification in any of a direct press method, a reheat press method, and a precision press method, the optical glass is suitable as glass for obtaining an optical element blank, a glass material for press forming, and an optical element.

That is, according to another aspect, provided are an optical element blank, a glass material for press forming and an optical element, which are made of the above-described optical glass.

According to a further aspect, provided is a process for producing a glass material for press forming, having a step of forming the above-described optical glass into the glass material for press forming.

According to another aspect, provided is a process for producing an optical element blank, having a step of making the optical element blank by performing press-forming using a press-forming mold, in the state where the above-described glass material for press forming is heated to be softened.

According to another aspect, provided is a process for producing an optical element, having a step of making the optical element at least by polishing the above-described optical element blank.

According to another aspect, provided is a process for producing an optical element blank, having a step of making the optical element blank by performing precision press-forming using a press-forming mold, in the state where the above-described glass material for press forming is heated to be softened.

It is to be understood that the present embodiment is illustrative and not restrictive. The scope of the present invention is defined by the appended claims rather than by the description preceding them, and all changes falling within meets and bounds of the claims or equivalence of such meets and bounds are intended to be embraced by the claims.

For example, it is possible to manufacture an optical glass according to an aspect of the present invention, by performing adjustment for the exemplified glass composition.

Of course, it is possible to optionally combine two or more of exemplified or preferred ranges with each other.

INDUSTRIAL APPLICABILITY

The present invention is useful in the field for producing various optical elements, such as a glass lens, a lens array, a diffraction grid, or a prism.

What is claimed is:

1. An optical glass, wherein the optical glass contains $P^{5+}$, $Al^{3+}$, $Ba^{2+}$, and $R^{2+}$, wherein $R^{2+}$ is one or more selected from the group consisting of $Mg^{2+}$, $Ca^{2+}$, $Sr^{2+}$, and $Zn^{2+}$, as essential cationic components, and contains $O^{2-}$ and $F^{-}$ as essential anionic components, a total content of $P^{5+}$, $Al^{3+}$, $Ba^{2+}$, $R^{2+}$, and $R'^{+}$, wherein $R'^{+}$ is one or more selected from the group consisting of $Li^{+}$, $Na^{+}$, and $K^{+}$, in a cationic component proportion being 86% or more, a molar ratio $Al^{3+}/P^{5+}$ of an $Al^{3+}$ content to a $P^{5+}$ content being 0.70 or more, a molar ratio $Al^{3+}/(Ba^{2+}+R^{2+})$ of the $Al^{3+}$ content to a total content of $Ba^{2}$ and $R^{2+}$ being 0.40 or more and a molar ratio $Ba^{2+}/(Ba^{2+}+R^{2+})$ of a $Ba^{2+}$ content to a total content of $Ba^{2+}$ and $R^{2+}$ being in a range of 0.50 to 0.85, and the optical glass has an Abbe's number vd of 72 or more but less than 80, a refractive index nd and the Abbe's number vd satisfying the following formula (A):

$$nd \geq 2.179 - 0.0085 \times vd \quad (A).$$

2. The optical glass according to claim 1, wherein an $O^{2-}$ content is in a range of 40 to 70%, and a $F^{-}$ content is in a range of 30 to 60%, in an anionic component proportion.

3. The optical glass according to claim 1, wherein the total content of $Ba^{2+}$ and $R^{2+}$ is in a range of 30 to 60%, in the cationic component proportion.

4. The optical glass according to claim 1, wherein the $P^{5+}$ content is in a range of 15 to 35%, in the cationic component proportion.

5. The optical glass according to claim 1, wherein a molar ratio $O^{2-}/P^{5+}$ of the $O^{2-}$ content to the $P^{5+}$ content is 3.30 or more.

6. The optical glass according to claim 1, wherein the $Al^{3+}$ content is in a range of 18 to 35%, in the cationic component proportion.

7. The optical glass according to claim 1, wherein a content of $RE^{3+}$ ($RE^{3+}$ is one or more selected from the group consisting of $Y^{3+}$, $La^{3+}$, $Gd^{3+}$ and $Lu^{3+}$) is 14% or less, in the cationic component proportion.

8. The optical glass according to claim 1, wherein a liquidus temperature is 850 degrees Celsius or less.

9. The optical glass according to claim 1, wherein a crystallization temperature Tc and a glass transition temperature Tg satisfy the following formula (1):

$$120 \text{ degrees Celsius} \leq (Tc - Tg) \quad (1)$$

10. An optical element made of an optical glass described in claim 1.

11. A process for producing a glass material for press forming comprising:
   a step of forming an optical glass described in claim 1 into a glass material for press forming.

12. An optical element blank made of an optical glass described in claim 1.

13. A process for producing an optical element comprising:
   a step of making an optical element at least by polishing an optical element blank described in claim 12.

14. A glass material for press forming made of an optical glass described in claim 1.

15. A process for producing an optical element blank comprising:
   a step of making the optical element blank by performing press-forming using a press-forming mold, in a state where a glass material for press forming described in claim 14 is heated to be softened.

16. A process for producing an optical element comprising:
   a step of making an optical element by performing precision press-forming using a press-forming mold, in a state where a glass material for press forming described in claim 14 is heated to be softened.

* * * * *